United States Patent
Okawara (10) Patent No.: US 7,480,003 B2
(45) Date of Patent: Jan. 20, 2009

(54) IMAGE PICKUP APPARATUS, CONTROL METHOD FOR THE SAME, AND PROGRAM FOR IMPLEMENTING THE CONTROL METHOD

(75) Inventor: Hiroto Okawara, Ibaraki (JP)

(73) Assignee: Canon Kabushiki Kaisha (JP)

( * ) Notice: Subject to any disclaimer, the term of this patent is extended or adjusted under 35 U.S.C. 154(b) by 1074 days.

(21) Appl. No.: 10/796,674

(22) Filed: Mar. 9, 2004

(65) Prior Publication Data
US 2004/0179129 A1 Sep. 16, 2004

(30) Foreign Application Priority Data
Mar. 10, 2003 (JP) ............................. 2003-063606

(51) Int. Cl.
*H04N 5/232* (2006.01)
(52) U.S. Cl. ...................... 348/349; 348/347
(58) Field of Classification Search ......... 348/345–357, 348/333.03, 333.01, 240.99–240.3
See application file for complete search history.

(56) References Cited
U.S. PATENT DOCUMENTS
5,075,777 A * 12/1991 Murata ................. 348/354
6,388,707 B1 * 5/2002 Suda ..................... 348/333.03
2003/0076437 A1 * 4/2003 Karasaki et al. ........... 348/347
2003/0123865 A1 * 7/2003 Hofer et al. ................ 396/72

FOREIGN PATENT DOCUMENTS
JP 4-154165 A 5/1992

* cited by examiner

*Primary Examiner*—Tuan V Ho
(74) *Attorney, Agent, or Firm*—Rossi, Kimms & McDowell, LLP (57) ABSTRACT

An image pickup apparatus that can realize a subject selecting function that can easily reflect a photographer's wishes without requiring a complex operation process, can prevent occurrences of unnecessary blurred images from an outset, can achieve the advantages of a distance measurement method limited to externally inputted positions, such as a selection of the subject, without sacrificing the AF performance of the conventional center-prioritized distance measurement method, and can carry out an appropriate focus adjustment for a main subject. A CPU selects one from a plurality of focus detecting regions on the screen of a display device. An operating element is provided that enables a photographer to instruct to change the selected focus detecting region. The CPU confirms the focus detecting region instructed to change by the photographer using the operating element when a predetermined condition is satisfied. The predetermined condition is that a predetermined time period has elapsed after the photographer instructed to change the selected focus detecting region.

10 Claims, 8 Drawing Sheets

PRIOR ART

FIG. 7
PRIOR ART

IMAGE PICKUP APPARATUS, CONTROL METHOD FOR THE SAME, AND PROGRAM FOR IMPLEMENTING THE CONTROL METHOD

BACKGROUND OF THE INVENTION

1. Field of the Invention

The present invention relates to an image pickup apparatus, a control method for the same, and a program for implementing the control method, and in particular to an image pickup apparatus that designates a region or position on a screen of a picked up image and carries out a focus adjustment for the designated the region and so on, a control method for the same, and a program for implementing the control method.

2. Description of the Related Art

In the field of consumer image pickup apparatuses, such as video/still cameras (digital camcorders), various attempts have been made to simplify operation and obtain higher-quality images, and various techniques have been proposed. The auto-focus (AF) function equipped as standard on digital camcorders in recent years removes the trouble of adjusting the focus every time an image is shot, and is therefore a typical example of a function that attains the object of making it easy to obtain high-quality images.

At the same time, great progress has been being made in miniaturizing and reducing the weight of digital camcorders. One reason for such progress is the existence of inner-focus type lenses. Inner-focus type lenses are lenses which are capable of shooting a subject just close to the front surface of the lens by not mechanically linking a correction lens and a zooming lens with a cam and instead storing movement loci of the correction lens as lens cam data in advance in a microcomputer, driving the correction lens in accordance with this lens cam data, and performing focusing using the correction lens. Such inner focus type lenses have the advantages of low cost, simplification of the system, and a reduction in size and weight of the lens barrel.

Figure 6:
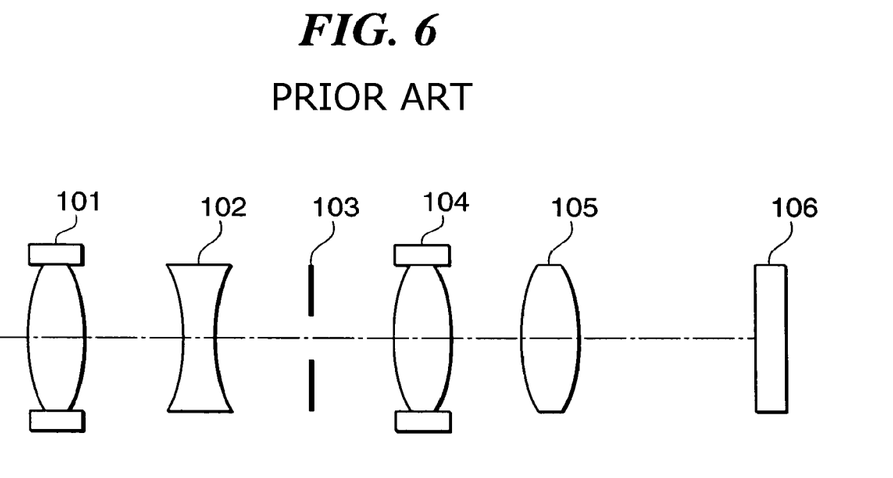
FIG. 6 is a schematic diagram showing the construction of a conventional inner focus-type lens system.

FIG. 6 is a schematic diagram showing the construction of a conventionally used inner-focus type lens system.

In FIG. 6, the lens system includes a fixed first lens group 101, a second lens group 102 for zooming, a diaphragm 103, a fixed third lens group 104, a fourth lens group (hereinafter referred to as the "focus lens") 105 that has a focus adjusting function and a so-called compensating function that compensates movement of the focal plane due to the zooming, and an image pickup surface 106.

Figure 7:
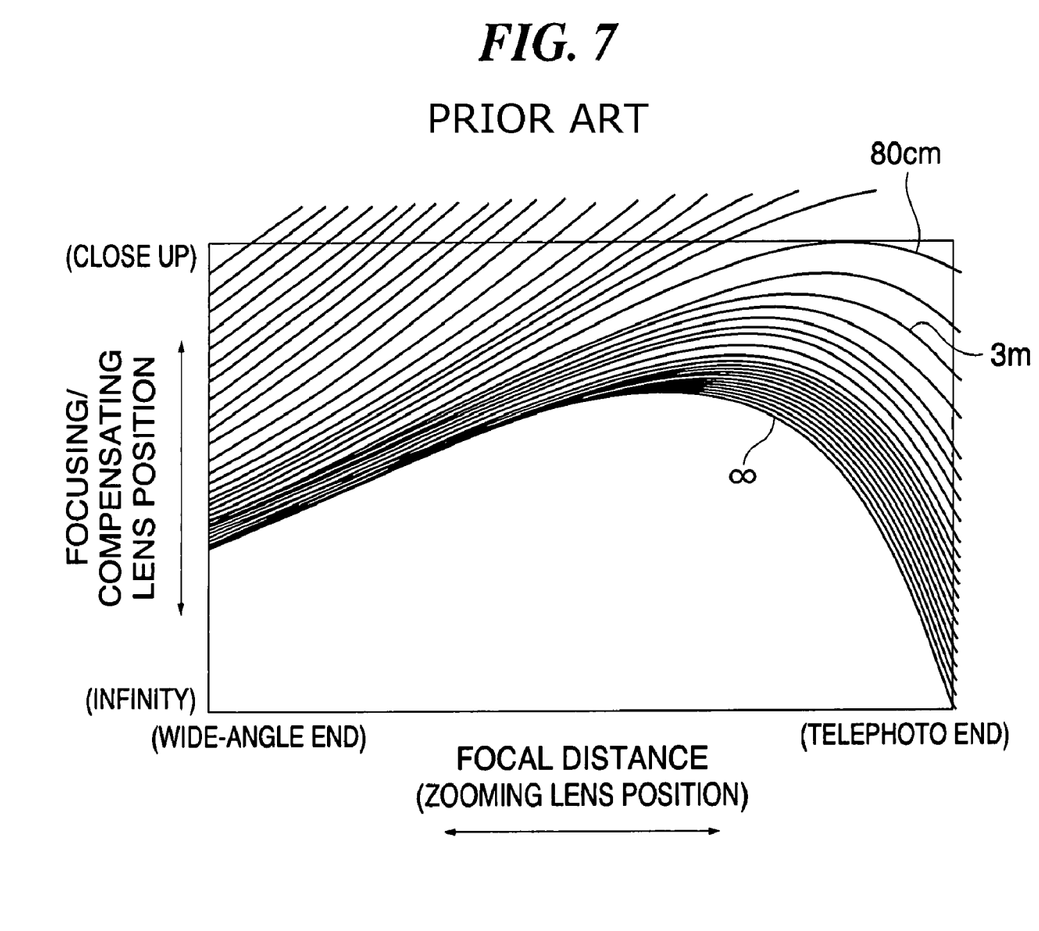
FIG. 7 is a graph showing loci of a focus lens shown in FIG. 6 in order to focus an image on an image pickup screen when the subject distance has changed at respective focal distances.

In this lens system, since the focus lens 105 has both the focus adjusting function and the compensating function, even if the focal distance does not change, the position of the focus lens 105 for focusing on the image pickup surface 106 differs according to a distance to the subject. If the position of the focus lens 105 for focusing on the image pickup surface 106 is continuously plotted as the distance to the subject is changed at respective focal distances, a graph like that shown in FIG. 7 is obtained. During zooming, if one of the focus loci shown in FIG. 7 is selected according to the distance to the subject and the focus lens 105 is moved according to the selected locus, zooming can be carried out with no blurring.

However, according to the AF described above, an image pickup apparatus, such as a camera, determines by itself photographic conditions and adjusts the lens position to a state that is thought to be appropriate for the photographic conditions, so that there are cases where the photographer's wishes are not reflected in the image. For example, when an AF operation is carried out using information for the entire image pickup screen in the case where a distant subject and a proximate subject are both present in the image pickup screen, it is likely that one of the plurality of subjects will be put in focus, but the image pickup apparatus cannot determine which is the main subject on which the photographer wishes to focus.

To avoid such situations as much as possible, a method that measures the distance to a subject located on the center of the image pickup screen with priority and executes an AF operation based on the result of the measurement is generally used. This is based on the fact that photographers often place the main subject on the center of the screen during photography. However, there are cases where this method is not able to appropriately adjust the focus for the main subject when the main subject is positioned away from the center of the screen.

On the other hand, to set the optimal focus regardless of where the main subject is positioned on the image pickup screen, an image pickup apparatus that can select the main subject based on the visual axis of the photographer gazing with his eye through the finder has been proposed (see Japanese Laid-Open Patent Publication (Kokai) No. H04-154165). According to this image pickup apparatus, it is possible to freely change the position of the main subject while specifying a distance measuring region. The position designating means for selecting the main subject is not limited to the visual axis detecting means, and another position designating means, using a pointer member such as a joystick or a mouse, that synthesizes amounts of movements of the pointing member on two axes in accordance with the subject to determine the direction and the position in and to which the pointing member has moved and thereby determine the main subject can be envisaged. Further, a selection function that selects a distance measuring region as desired from a plurality of distance measuring regions set in advance using the visual axis detecting means or the position designating means can be envisaged as an easily realizable function.

In recent years, there have been increased functions having compatibility between digital camcorders and digital still cameras. On the one hand, moving image recording functions of digital still cameras are becoming increasingly advanced, while digital camcorders on the market that are capable of recording still images and moving images onto card-type storage media as well as onto tape-type storage media. For digital camcorders, an operation method where still images are recorded using a "photo" switch and moving images are recorded using a "trigger" switch (start/stop switch) is becoming increasingly common.

The above-described function of selecting one or a plurality of regions are selected out of a plurality of distance measuring regions should preferably be available anytime while the camera is in operation. However, the above function that reflects the photographer's wishes is a so-called "manually" operating function, and therefore such operations cannot be carried out without performing a predetermined key operation. For example, it has been necessary to carry out a three-step operation in which switching to a selection mode for selecting a distance measuring region is carried out in a first step, changing or switching the selected distance measuring region is carried out in a second step, and confirmation of the selected distance measuring region is carried out in a third step. The first step and the third step are carried out using a different switch to one used for the second step. It is difficult to carry out two types of switch operation while looking through the finder or at a monitor.

Further, as is clear from FIG. 7, referred to above, in a zooming operation of moving a zooming lens from a "wide-angle" position to a "telephoto" position, the focus lens moves from a region where focus loci converge to a region where the focus loci diverge, so that at the wide-angle position it is not possible to determine the subject distance of the locus that enables a focused state to be maintained from the wide-angle position to the telephoto position. For this reason, in general, zooming is carried out towards the "telephoto" end while determining a focus locus by maintaining the focused state using AF information. However, during high-speed zooming where only a reduced number of detection of AF information can be obtained, making it difficult to maintain and determine the focus locus. When a high-speed zooming operation and switching of the distance measuring region are carried out at the same time, that is, zooming is carried out while the distance to a main subject is changed, it is difficult to maintain the focused state, resulting in occurrence of blurring. Since time is required to focus on a new subject during change of the distance measuring region, problems such as significant blurring can occur, which prevent high quality images from being obtained.

During still image photography, a method for focusing by a digital camera has been generally employed, in which, to increase the reliability of focusing, the focus lens is moved within a predetermined search range by operating the photo switch to obtain a focusing signal indicative of focusing having been reached during the movement of the focus lens, and the position of the focus lens at which the focus signal assumes the maximum degree of focusing is detected by calculation or the like to find a focused position. However, if the distance measuring region is changed during the above focus search, the focus search operation searches for foci for different subjects during the search, resulting in the problem that proper focusing cannot be obtained. Also, when the distance measuring region is changed during the recording of moving images activated by operation of the trigger switch, blurring occurs until the apparatus responds to switching of the main subject, so that it has not been possible to obtain high-quality images.

Unlike still image photography, during moving image photography photographic effects and image lay-out are usually carried out by camera work and zooming, and therefore the stability of focus is very important for successful formation of an image. To this end, the stability of focus is given priority over focusing response for the main subject, so that it is desirable to automatically optimize the distance measuring region according to the photographic conditions, in various types of distance measurements such as "entire screen distance measurement", "center-prioritized distance measurement", and "periphery-prioritized distance measurement" for a hollow subject. However, during selection of the distance measuring region, it is unclear whether the photographer will next operate the photo switch or the trigger switch. If the selected distance measuring region is at the edge of the screen and moving image recording is carried out using the trigger switch, if distance measuring region control is automatically started in the center-prioritized distance measurement mode, for example, the recording of moving images starts before the focusing operation for a central subject due to the change of the subject is completed. This results in blurred images being recorded at the start of recording.

SUMMARY OF THE INVENTION

It is an object of the present invention to provide an image pickup apparatus, a control method for the same, and a program for implementing the control method that can realize a subject selecting function that can easily reflect a photographer's wishes without requiring a complex operation process, can prevent occurrences of unnecessary blurred images from an outset, can achieve the advantages of a distance measurement method limited to externally inputted positions, such as a selection of the subject, without sacrificing the AF performance of the conventional center-prioritized distance measurement method, and can carry out an appropriate focus adjustment for a main subject.

To attain the above the object, in a first aspect of the present invention, there is provided an image pickup apparatus comprising an image pickup device that picks up an image of a subject and converts the image to an image pickup signal, a display device that displays a picked-up image based on the image pickup signal outputted from the image pickup device, a selecting device that selects at least one from a plurality of focus detecting regions on a screen of the display device, an extracting device that extracts a focus signal from the image pickup signal in the at least one focus detecting region selected by the selecting device, a focus adjusting device that carries out focus adjustment on the image pickup device based on the focus signal extracted by the extracting device, an operating element that enables a photographer to instruct to change the at least one focus detecting region selected by the selecting device, and a confirming device that confirms the at least one focus detecting region instructed to change by the photographer using the operating element when a predetermined condition is satisfied, wherein the predetermined condition is that a predetermined time period has elapsed after the photographer instructed to change the at least one focus detecting region.

To attain the above object, in a second aspect of the present invention, there is provided an image pickup apparatus comprising an image pickup device that picks up an image of a subject and converts the image to an image pickup signal, a display device that displays a picked-up image based on the image pickup signal outputted from the image pickup device, a selecting device that selects at least one from a plurality of focus detecting regions on a screen of the display device, an extracting device that extracts a focus signal from the image pickup signal in the at least one focus detecting region selected by the selecting device, a focus adjusting device that carries out focus adjustment on the image pickup device based on the focus signal extracted by the extracting device, an operating element that enables a photographer to instruct to change the at least one focus detecting region selected by the selecting device, and a confirming device that confirms the at least one focus detecting region instructed to change by the photographer using the operating element when a predetermined condition is satisfied, wherein the image pickup device is capable of picking up the image of the subject with zooming, and the predetermined condition is that a zooming operation has been started by the pickup device.

To attain the above object, in a third aspect of the present invention, there is provided an image pickup apparatus comprising an image pickup device that picks up an image of a subject and converts the image to an image pickup signal, a display device that displays a picked-up image based on the image pickup signal outputted from the image pickup device, a selecting device that selects at least one from a plurality of focus detecting regions on a screen of the display device, an extracting device that extracts a focus signal from the image pickup signal in the at least one focus detecting region selected by the selecting device, a focus adjusting device that carries out focus adjustment on the image pickup device based on the focus signal extracted by the extracting device, an operating element that enables a photographer to instruct to change the at least one focus detecting region selected by the selecting device, a confirming device that confirms the at least one focus detecting region instructed to change by the photographer using the operating element when a predetermined condition is satisfied, and a recording device that records the image pickup signal outputted from the image pickup device, wherein the predetermined condition is that an operation of recording the image pickup signal has been started by the recording device.

Preferably, the image pickup apparatus according to the third aspect further comprises an inhibiting device that inhibits an operation of selecting the at least one focus detecting region by the selecting device during the zooming operation by the image pickup device.

Preferably, the image pickup apparatus according to the third aspect further comprises an inhibiting device that inhibits an operation of selecting the at least one focus detecting region by the selecting device during the recording operation by the recording device.

Preferably, in the image pickup apparatus according to the third aspect, the display device displays the at least one focus detecting region selected by the selecting device in a manner superimposed on the picked-up image.

Preferably, in the image pickup apparatus according to the third aspect, the operating element is an operating element selected from the group consisting of a seesaw-type operating element, a dial-type operating element, and a jog-type operating element.

To attain the above object, in a fourth aspect of the present invention, there is provided an image pickup apparatus comprising an image pickup device that picks up an image of a subject and converts the image to an image pickup signal, a display device that displays a picked-up image based on the image pickup signal outputted from the image pickup device, an automatic selection device that automatically selects at least one from a plurality of focus detecting regions on a screen of the display device, a manual selecting device that selects at least one out of the plurality of focus detecting regions according to an instruction from a photographer, an extracting device that extracts a focus signal from the image pickup signal in the at least one focus detecting region selected by one of the automatic selection device and the manual selection device, a focus adjusting device that carries out focus adjustment on the image pickup device based on the focus signal extracted by the extracting device, a first operating element that enables the photographer to instruct to carry out still image photography, a second operating element that enables the photographer to instruct to carry out moving image photography, a recording device that records the image pickup signal outputted from the image pickup device as a still image in accordance with an instruction to carry out the still image photography given by the photographer using the first operating element and records the image pickup signal outputted from the image pickup device as a moving image in accordance with an instruction to carry out the moving image photography given by the photographer using the second operating element, and a control device that provides control to cause the automatic selection device to select the at least one focus detecting region when the photographer has instructed to carry out the moving image photography and cause the second operating element to inhibit recording of the moving image by the recording device until the focus adjustment by the focus adjusting device based on the focus signal extracted from the at least one focus detecting region is completed.

To attain the above object, in a fifth aspect of the present invention, there is provided a control method for an image pickup apparatus comprising a display step of displaying, on a display device, an image pickup signal outputted from an image pickup device that picks up an image of a subject and converts the image to the image pickup signal, a selecting step of selecting at least one from a plurality of focus detecting regions on a screen of the display device, an extracting step of extracting a focus signal from the image pickup signal in the at least one focus detecting region selected in the selecting step, a focus adjusting step of carrying out focus adjustment on the image pickup device based on the focus signal extracted in the extracting step and a confirming step of confirming the at least one focus detecting region instructed to change by the photographer using an operating element that enables a photographer to instruct to change the at least one focus detecting region selected in the selecting step when a predetermined condition is satisfied, wherein the predetermined condition is that a predetermined time period has elapsed after the photographer instructed to change the at least one focus detecting region.

To attain the above object, in a sixth aspect of the present invention, there is provided a control method for an image pickup apparatus comprising a display step of displaying, on a display device, an image pickup signal outputted from an image pickup device that picks up an image of a subject and converts the image to the image pickup signal, a selecting step of selecting at least one from a plurality of focus detecting regions on a screen of the display device, an extracting step of extracting a focus signal from the image pickup signal in the at least one focus detecting region selected in the selecting step, a focus adjusting step of carrying out focus adjustment on the image pickup device based on the focus signal extracted in the extracting step, and a confirming step of confirming the at least one focus detecting region instructed to change by the photographer using an operating element that enables a photographer to instruct to change the at least one focus detecting region selected in the selecting step when a predetermined condition is satisfied, wherein the image pickup device is capable of picking up the image of the subject with zooming, and the predetermined condition is that a zooming operation has been started by the pickup device.

To attain the above object, in a seventh aspect of the present invention, there is provided a control method for an image pickup apparatus comprising a display step of displaying, on a display device, an image pickup signal outputted from an image pickup device that picks up an image of a subject and converts the image to the image pickup signal, a selecting step of selecting at least one from a plurality of focus detecting regions on a screen of the display device, an extracting step of extracting a focus signal from the image pickup signal in the at least one focus detecting region selected in the selecting step, a focus adjusting step of carrying out focus adjustment on the image pickup device based on the focus signal extracted in the extracting step, and a confirming step of confirming the at least one focus detecting region instructed to change by the photographer using an operating element that enables a photographer to instruct to change the at least one focus detecting region selected in the selecting step when a predetermined condition is satisfied, and a recording step of recording the image pickup signal outputted from the image pickup device, wherein the predetermined condition is that an operation of recording the image pickup signal has been started by the recording step.

To attain the above object, in an eighth aspect of the present invention, there is provided a control method for an image pickup apparatus comprising a display step of displaying, on a display device, an image pickup signal outputted from an image pickup device that picks up an image of a subject and converts the image to the image pickup signal, an automatic selection step of automatically selecting at least one from a plurality of focus detecting regions on a screen of the display device, a manual selecting step of selecting at least one out of the plurality of focus detecting regions according to an instruction from a photographer, an extracting step of extracting a focus signal from the image pickup signal in the at least one focus detecting region selected in one of the automatic selection step and the manual selecting step, a focus adjusting step of carrying out focus adjustment on the image pickup device based on the focus signal extracted in the extracting step, a recording step of recording the image pickup signal outputted from the image pickup device as a still image in accordance with an instruction to carry out still image photography given by the photographer using a first operating element and recording the image pickup signal outputted from the image pickup device as a moving image in accordance with an instruction to carry out moving image photography given by the photographer using a second operating element, and a control step of providing control to cause the automatic selection step to select the at least one focus detecting region when the photographer has instructed to carry out the moving image photography using the second operating element and to inhibit recording of the moving images in the recording step until the focus adjustment in the focus adjusting step based on the focus signal extracted from the at least one focus detecting region is completed.

To attain the above object, in a ninth aspect of the present invention, there is provided a computer-readable program for causing a computer to execute a control method for an image pickup apparatus, comprising a display module for displaying, on a display device; an image pickup signal outputted from an image pickup device that picks up an image of a subject and converts the image to the image pickup signal, a selecting module for selecting at least one from a plurality of focus detecting regions on a screen of the display device, an extracting module for extracting a focus signal from the image pickup signal in the at least one focus detecting region selected by the selecting module, a focus adjusting module for carrying out focus adjustment on the image pickup device based on the focus signal extracted by the extracting module, and a confirming module for confirming the at least one focus detecting region instructed to change by the photographer using an operating element that enables a photographer to instruct to change the at least one focus detecting region selected by the selecting module when a predetermined condition is satisfied, wherein the predetermined condition is that a predetermined time period has elapsed after the photographer instructed to change the at least one focus detecting region.

To attain the above object, in a tenth aspect of the present invention, there is provided a computer-readable program for causing a computer to execute a control method for an image pickup apparatus, comprising a display module for displaying, on a display device, an image pickup signal outputted from an image pickup device that picks up an image of a subject and converts the image to the image pickup signal, a selecting module for selecting at least one from a plurality of focus detecting regions on a screen of the display device, an extracting module for extracting a focus signal from the image pickup signal in the at least one focus detecting region selected by the selecting module, a focus adjusting module for carrying out focus adjustment on the image pickup device based on the focus signal extracted by the extracting module, and a confirming module for confirming the at least one focus detecting region instructed to change by the photographer using an operating element that enables a photographer to instruct to change the at least one focus detecting region selected by the selecting module when a predetermined condition is satisfied, wherein the image pickup device is capable of picking up the image of the subject with zooming, and the predetermined condition is that a zooming operation has been started by the pickup device.

To attain the above object, in an eleventh aspect of the present invention, there is provided a computer-readable program for causing a computer to execute a control method for an image pickup apparatus, comprising a display module for displaying, on a display device, an image pickup signal outputted from an image pickup device that picks up an image of a subject and converts the image to the image pickup signal, a selecting module for selecting at least one from a plurality of focus detecting regions on a screen of the display device, an extracting module for extracting a focus signal from the image pickup signal in the at least one focus detecting region selected by the selecting module, a focus adjusting module for carrying out focus adjustment on the image pickup device based on the focus signal extracted by the extracting module, and a confirming module for confirming the at least one focus detecting region instructed to change by the photographer using an operating element that enables a photographer to instruct to change the at least one focus detecting region selected by the selecting module when a predetermined condition is satisfied, and a recording module for recording the image pickup signal outputted from the image pickup device, wherein the predetermined condition is that an operation of recording the image pickup signal has been started by the recording module.

To attain the above object, in a twelfth aspect of the present invention, there is provided A computer-readable program for causing a computer to execute a control method for an image pickup apparatus, comprising a display module for displaying, on a display device, an image pickup signal outputted from an image pickup device that picks up an image of a subject and converts the image to the image pickup signal, an automatic selection module for automatically selecting at least one from a plurality of focus detecting regions on a screen of the display device, a manual selecting module for selecting at least one out of the plurality of focus detecting regions according to an instruction from a photographer, an extracting module for extracting a focus signal from the image pickup signal in the at least one focus detecting region selected by one of the automatic selection module and the manual selecting module, a focus adjusting module for carrying out focus adjustment on the image pickup device based on the focus signal extracted by the extracting module, a recording module for recording the image pickup signal outputted from the image pickup device as a still image in accordance with an instruction to carry out still image photography given by the photographer using a first operating element and recording the image pickup signal outputted from the image pickup device as a moving image in accordance with an instruction to carry out moving image photography given by the photographer using a second operating element, and a control module for providing control to cause the automatic selection module to select the at least one focus detecting region when the photographer has instructed to carry out the moving image photography using the second operating element and to inhibit recording of the moving images by the recording module until the focus adjustment in the focus adjusting step based on the focus signal extracted from the at least one focus detecting region is completed.

The above and other objects, features, and advantages of the invention will become more apparent from the following detailed description taken in conjunction with the accompanying drawings.

DESCRIPTION OF THE PREFERRED EMBODIMENTS

The present invention will now be described in detail with reference to the drawings showing preferred embodiments thereof.

Figure 1:
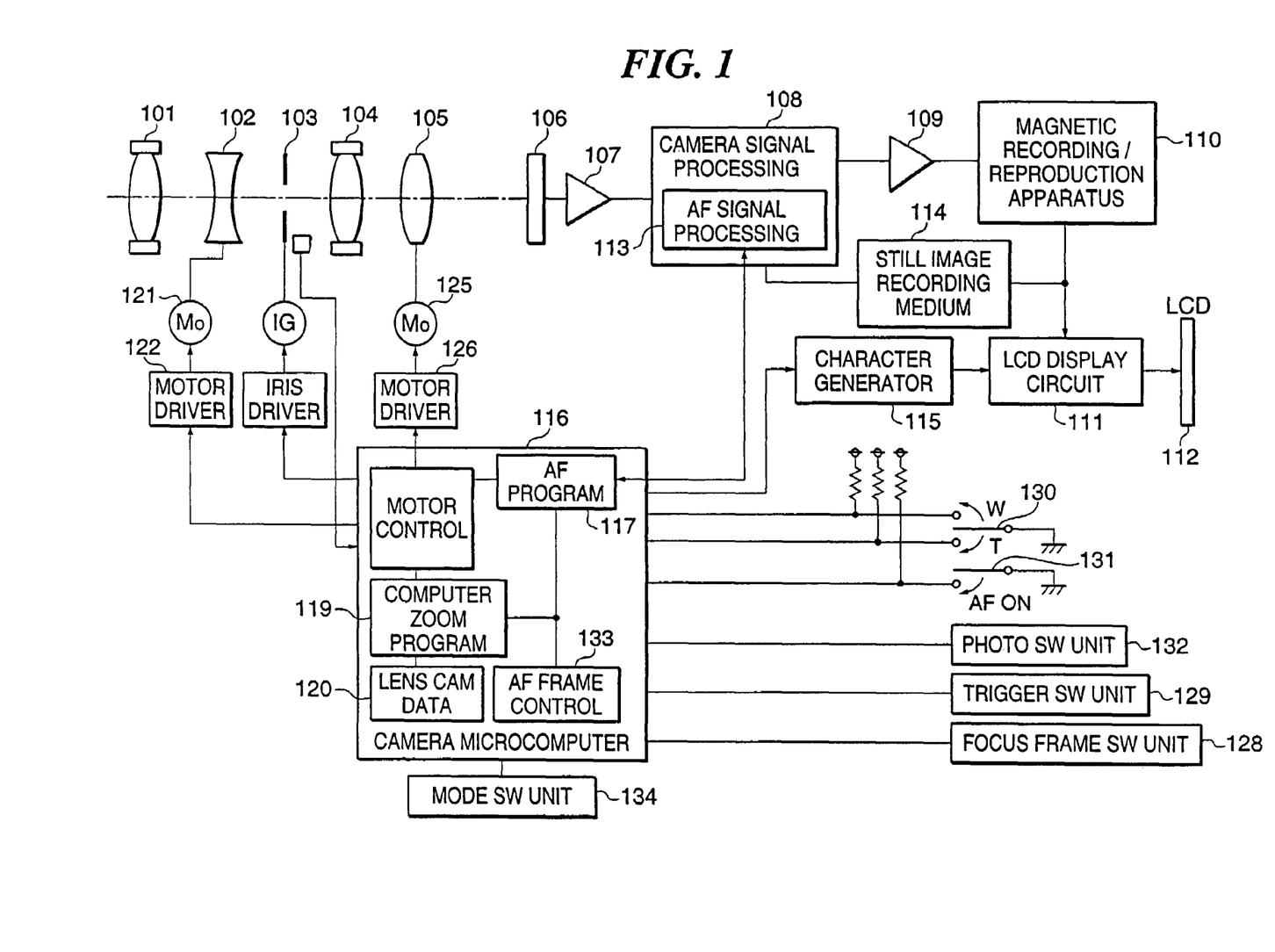
FIG. 1 is a schematic diagram showing the construction of an image pickup apparatus according to a first embodiment of the present invention.

FIG. 1 is a schematic diagram showing the construction of an image pickup apparatus according to a first embodiment of the present invention.

In FIG. 1, light from the subject passes through a fixed first lens group 101, a second lens group (hereinafter, "zoom lens") 102 that carries out zooming, a diaphragm 103, a fixed third lens group 104, and a fourth lens group (hereinafter "focus lens") 105 with a focus adjusting function and a compensating function for compensating for movement of a focal plane due to zooming, so that an image is formed on an image pickup element 106, such as a CCD (Charge Coupled Device). The image that has been formed on the image pickup element 106 by the light that has passed through the lenses is subjected to photoelectric conversion, is amplified to an optimal level by an amplifier 107, and is then inputted to a camera signal processing circuit 108 as an image pickup signal. The inputted signal is converted to a normal television signal, amplified to an optimal level by an amplifier 109, and sent to a magnetic recording/reproduction apparatus 110 and also simultaneously sent to an LCD (Liquid Crystal Display) circuit 111, so that the signal is displayed as a picked-up image on an LCD 112 used as a monitor. It should be noted that a camera microcomputer 116 controls a character generator 115, an output signal of which is mixed by the LCD display circuit 111 and thereby superimposed on the picked-up image, resulting in information for informing the photographer of a photographic mode, a photographic state, warnings, and the like being displayed on the LCD 112.

On the other hand, it is possible for the image pickup signal inputted to the camera signal processing circuit 108 to be subjected to JPEG (Joint Photographic Experts Group) conversion processing by an internal memory, not shown, simultaneously with the input and to be recorded after the conversion in a still image recording medium 114, such as a card medium. The image pickup signal inputted to the camera signal processing circuit 108 is simultaneously inputted to an AF signal processing circuit 113. Via communication with the camera microcomputer 116, an AF evaluation value generated by the AF signal processing circuit 113 is read from the AF signal processing circuit 113 as an AF evaluation value signal.

The camera microcomputer 116 detects states of a zoom switch 130 and an AF switch 131, and also detects states of a photo switch unit 132 and a trigger switch unit 129. The photo switch unit 132 has two positions that depend on an amount of depression of the switch. One position is a half pressing that results in a focusing operation being carried out according to the AF and a focus lock operation being carried out at the focused position. Another position is a full pressing (deep pressing) that results in an image being captured into an internal memory, not shown, inside the camera signal processing circuit 108, and a still image being recorded in the magnetic recording/reproduction apparatus 110, the still image recording medium 114, or the like.

The trigger switch unit 129 is implemented by a toggle operating switch that switches between start of moving image recording and recording standby, to start recording the picked-up moving images in the magnetic recording/reproduction apparatus 110, the still image recording medium 114, or the like. It should be noted that the camera microcomputer 116 determines, according to the state of a mode switch unit 134, whether moving image photography or still image photography is being carried out and controls, via the camera signal processing circuit 108, the magnetic recording/reproduction apparatus 110 or the still image recording medium 114 to supply a suitable image signal for the recording medium. When the mode switch unit 134 is in a reproduction state, the camera microcomputer 116 carries out reproduction control such that an image signal is read from the magnetic recording/reproduction apparatus 110 or the still image recording medium 114 and reproduction is carried out based on the read image signal.

When the AF switch 131 is OFF and the zoom switch 130 is pressed in one of a telephoto (T) and wide-angle (W) directions, the camera microcomputer 116 executes a computer zoom program 119 to send a control signal to a zoom motor driver 122 based on lens cam data 120 stored in advance in an internal memory of the camera microcomputer 116 so as to drive the zoom lens in one of the telephoto and wide-angle directions in accordance with the direction in which the zoom switch 130 is pressed. By this control, the zoom lens 102 is driven via a zoom motor 121, and at the same time a signal is sent to a focus motor driver 126 to move the focus lens 105 via a focus motor 125 to thereby carry out a zooming operation.

When the AF switch 131 is ON and the zoom switch 130 is pressed in one of the telephoto (T) and the wide-angle (W) directions, the focused state needs to be maintained, so that the computer zoom program 119 is executed to carry out a zooming operation by referring not only to the lens cam data 120 but also to an AF evaluation value signal sent to the camera microcomputer 116 from the AF signal processing circuit 113 while the focus lens is maintained at a position at which the highest AF evaluation value is obtained.

When the AF switch 131 is ON but the zoom switch 130 is not pressed, a signal is sent from an AF program 117 to the focus motor driver 126 so that the AF evaluation value signal sent from the camera microcomputer 116 shows the highest AF evaluation value and an automatic focus adjustment operation is carried out by moving the focus lens 105 via the focus motor 125.

According to the present embodiment, it is possible to select a desired distance measuring region from a plurality of distance measuring regions displayed on a display such as the finder or the monitor. A focus frame selecting switch (focus frame SW unit) 128 is an operating switch that enables the photographer to select a distance measuring region (to select an AF frame). This switch can be an operating key of a seesaw type, a dial type, or a jog type that enables switching to an AF frame (distance measurement frame) selecting mode and change of the selected distance measuring region to be carried out by the single operating member. The operation state of the focus frame selecting switch 128 is detected by the camera microcomputer 116 and an AF frame control section 133 changes the distance measuring region (AF frame) in accordance with the operation state of the focus frame selecting switch 128, thereby making it possible to carry out photography that reflects the photographer's wishes.

Figure 2:
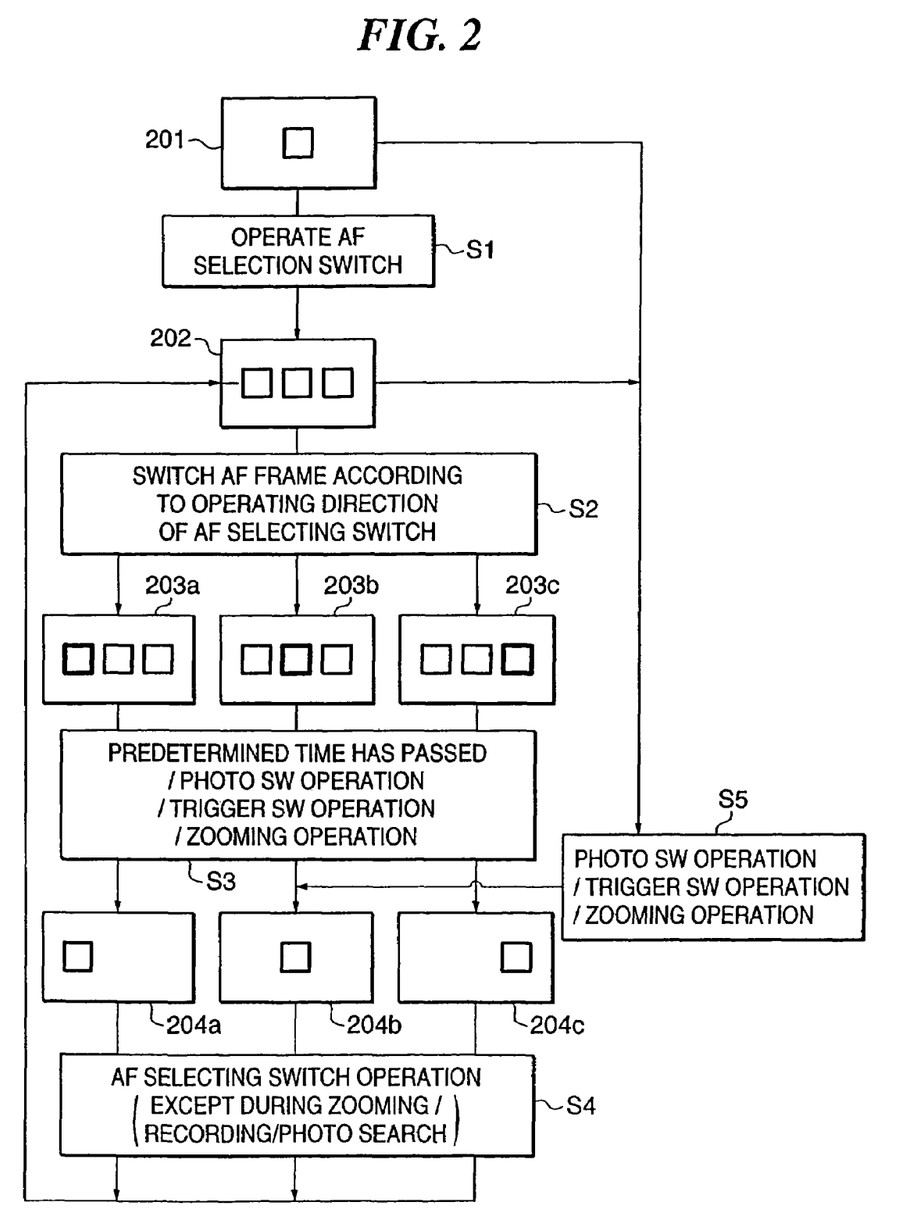
FIG. 2 is a schematic diagram showing a selection of distance measuring region carried out by the image pickup apparatus shown in FIG. 1.

FIG. 2 is a schematic diagram showing the selection of a distance measuring region carried out by the image pickup apparatus shown in FIG. 1. In the present embodiment, it is assumed that the photographer selects one out of three distance measuring regions provided by the image pickup apparatus.

In FIG. 2, a screen 201 is an initial display screen displayed by a display such as the finder, with the distance measuring region (AF frame) being displayed on the center as a default. For example, when the photographer carries out a photo switch operation (step S5), the distance measuring region (AF frame) displayed on the center is confirmed (step 204b). The AF frame displayed on the center is confirmed also when a trigger switch operation or a zooming operation is carried out (step S5). When the photographer carries out an up/down or left/right key operation of the focus frame selecting switch 128 (step S1), the display changes to a multiple frame display screen 202 in which a plurality of AF frames are displayed, and the mode changes to the AF frame selecting mode. In this state, when the photographer carries out a photo switch operation, a trigger switch operation, or a zooming operation (step S5), a distance measuring region (AF frame) displayed on the center is confirmed (step 204b). On the other hand, the selected AF frame is switched and a corresponding one of screens 203a to 203c is displayed each time the focus frame selecting switch 128 is operated (step S2). For example, when a predetermined time period has elapsed without the focus frame selecting switch 128 being operated (step S3), the presently selected AF frame is confirmed as shown by screens 204a to 204c. If the presently selected AF frame is confirmed (step S4), the display returns to the screen 202 through the operation of the focus frame selecting switch 128.

It should be noted that the photographer can be informed of the selection state of the distance measuring region in the multiple frame display state as shown in FIG. 2 by putting the selected distance measuring region in an active state and indicated by a highlighted display, a color display, or by any other method.

Figure 3:
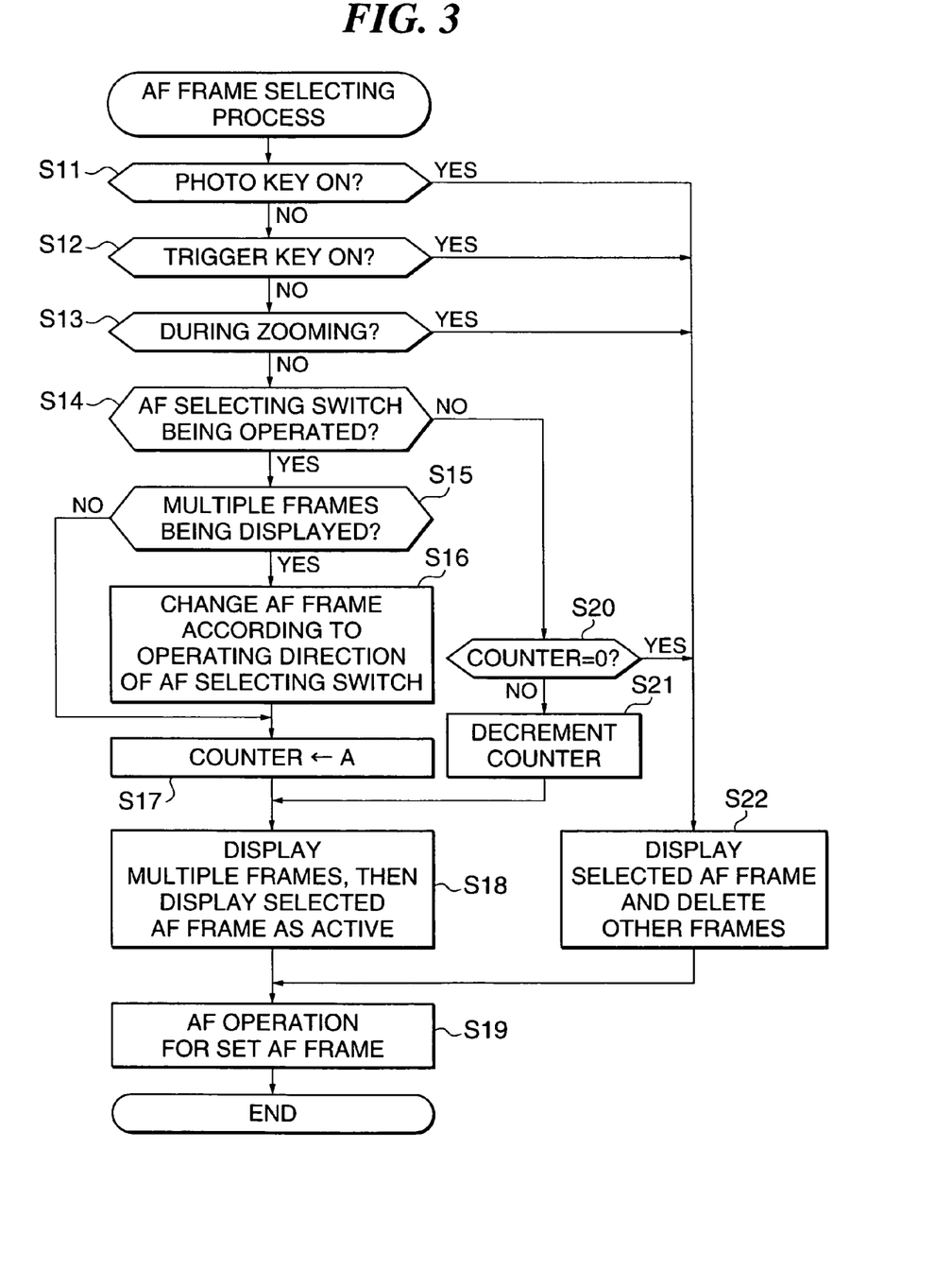
FIG. 3 is a flowchart showing the procedure of an AF frame selecting process executed by the image pickup apparatus shown in FIG. 1.

FIG. 3 is a flowchart showing the procedure of the AF frame selecting process executed by the image pickup apparatus shown in FIG. 1. It should be noted that in actuality, focusing processing, not shown, is carried out during an AF operation and lens control processing, not shown, is carried out during a zooming operation. Description of a method of recording on the magnetic recording/reproduction apparatus 110 and the still image recording medium 114 is also omitted. The process shown in FIG. 3 is carried out for each vertical synchronization signal, and in the case of an NTSC (National Television System Committee) camera, for example, the processing cycle is 60 Hz.

As described earlier with reference to FIG. 1, the camera microcomputer 116 determines whether to record picked-up images on a tape of the magnetic recording/reproduction apparatus 110 or on a card of the still image recording medium 114 according to the state of the mode switch unit 134. Further, the camera microcomputer 116 carries out control to have picked-up images recorded as still image picked-up images according to the state of the photo switch unit 132 and/or as moving images according to the state of the trigger switch unit 129.

In FIG. 3, in steps S11 to S13, it is determined whether key operations have been made by the respective keys of the photo switch unit 132, the trigger switch unit 129, and the zoom switch 130. When none of these keys has been operated, it is determined whether the focus frame selecting switch 128 has been operated (step S14), and when the focus frame selecting switch 128 is being operated, it is determined in a step S15 whether the multiple frame display screen is already being displayed and the AF frame selecting mode has been selected. If the state is that shown in the screen 201 of FIG. 2 described above, to change the display to the screen 202, a predetermined value A is set to a counter in a step S17, multiple frame display is carried out on the screen 202 in a step S18, and then one of the frames being displayed is put in the active state and this active frame is highlighted to inform the photographer of the presently selected AF frame (step S18).

After this, an autofocus (AF) operation is carried out using the AF frame in the active state (step S19), and the present process is terminated.

In accordance with the next vertical synchronization signal, the present process is started from the step S11, and when the process has advanced to the step S15, the screen 202 is already being displayed, and then in the step S16 the AF screen in the active state is changed in accordance with an operation of the focus frame selecting switch 128. In the step S17, the predetermined value A is set to the counter, and the display is switched to a corresponding one of the screens 203a to 203c, that is, the presently selected frame is highlighted in the display as being in the active state (the step S18).

Next, an AF operation is carried out using the AF frame in the active state (the step S19), and the present process is terminated.

Thereafter, the above processing shown in FIG. 3 is repeated, and then, if a state where the focus frame selecting switch 128 is not operated in the step S14 has continued, it is determined in steps S20 and S21 whether the unoperated state has continued for the predetermined time period A. When the predetermined time period A elapsed, only the frame in the active state is displayed in a step S22 to carry out a confirmation process for the AF frame, and then an AF operation is carried out using the selected AF frame in the step S19. Display of the confirmation of the frame (on a corresponding one of the screens 204a to 204c in FIG. 2) is carried out to prevent various information from being displayed on the screen of the finder to confuse the photographer and make it easy for the photographer to recognize the selected frame.

In the state where the AF frame has been confirmed, if the focus frame selecting switch 128 is operated again, the processing of the step S14 and subsequent steps is repeated so that the operations from frame selection to confirmation are carried out while the display changes from the screens 204a to 204c, the screen 202, the screens 203a to 203c, the screens 204a to 204c in the mentioned order. In particular, since the focus frame selecting switch 128 is a rotational type, a seesaw type, or a jog type operating key, the sequence of AF frame selection operations described above can be realized using merely the single focus frame selecting switch 128, so that it is possible to provide the manually operating function with superior operability.

When the zoom switch 130 has been operated to start a zooming operation, the process proceeds from the step S13 to the step S22, wherein the selected AF frame is confirmed (the confirmation is displayed on one of the screens 204*a* to 204*c*). This is to prevent the AF frame from being switched during a zooming operation. In particular, switching the AF frame during a high-speed zooming operation causes blurring, and time is required to recover from the blurring after switching the AF frame, so that such blurring lasts until the telephoto end is reached. Although it is possible to avoid the above problem by inhibiting the switching of frames during the display of multiple frames, if multiple frames continue to be displayed during zooming, the photographer can mistakenly think that it is still possible to select the AF frame. For this reason, in the present embodiment one AF frame is confirmed and AF frames other than the frame in the active state are not displayed.

As described earlier with respect to the prior art, during still image photography, to increase the reliability of the focusing, focusing is carried out by the method in which the focus lens is caused to search within a predetermined search range by operating the photo switch unit 132 to obtain a focus signal during the search, and the position of the focus lens at which the focus signal assumes the maximum degree of focusing is detected by calculation or the like to find a focused position. However, if the distance measuring region is changed during the above focus search, the focus search operation searches for foci for different subjects during the search, resulting in the problem that proper focusing cannot be obtained. According to the present embodiment, when the photo switch unit 132 is operated during the selection of an AF frame through the display of multiple frames, the frame in the active state is confirmed by the processing from the step S11 to the step S22 (that is, one of the screens 204*a* to 204*c* is confirmed), and a focus search is carried out using the confirmed AF frame, to thereby prevent the above problem from occurring.

Also, if the distance measuring region is changed during the recording of moving images activated by operation of the trigger switch, blurring occurs until the apparatus responds to switching of the main subject, so that it is not possible to obtain high-quality images. To prevent this, the distance measuring region is inhibited from being changed by the processing from the step S12 to the step S22 (that is, one of the screens 204*a* to 204*c* is confirmed).

Here, if switching of the selected frame is inhibited even during display of multiple frames, it is possible to avoid the problem described above. However, if the display of multiple frames is continued during recording and/or photo search, the photographer can mistakenly think that it is still possible to select the AF frame. For this reason, in the present embodiment, one AF frame is confirmed and AF frames other the frame in the active state are deleted from the display.

Next, a description will be given of a second embodiment of the present invention.

An image pickup apparatus according to the second embodiment is constructed so as to enable optimal AF operations to be carried out during moving image photography, while realizing an easy-to-use distance measuring region selection function. It should be noted that the system construction of the image pickup apparatus according to the present embodiment is the same as that of the first embodiment (see FIG. 1) described above.

Figure 4A:
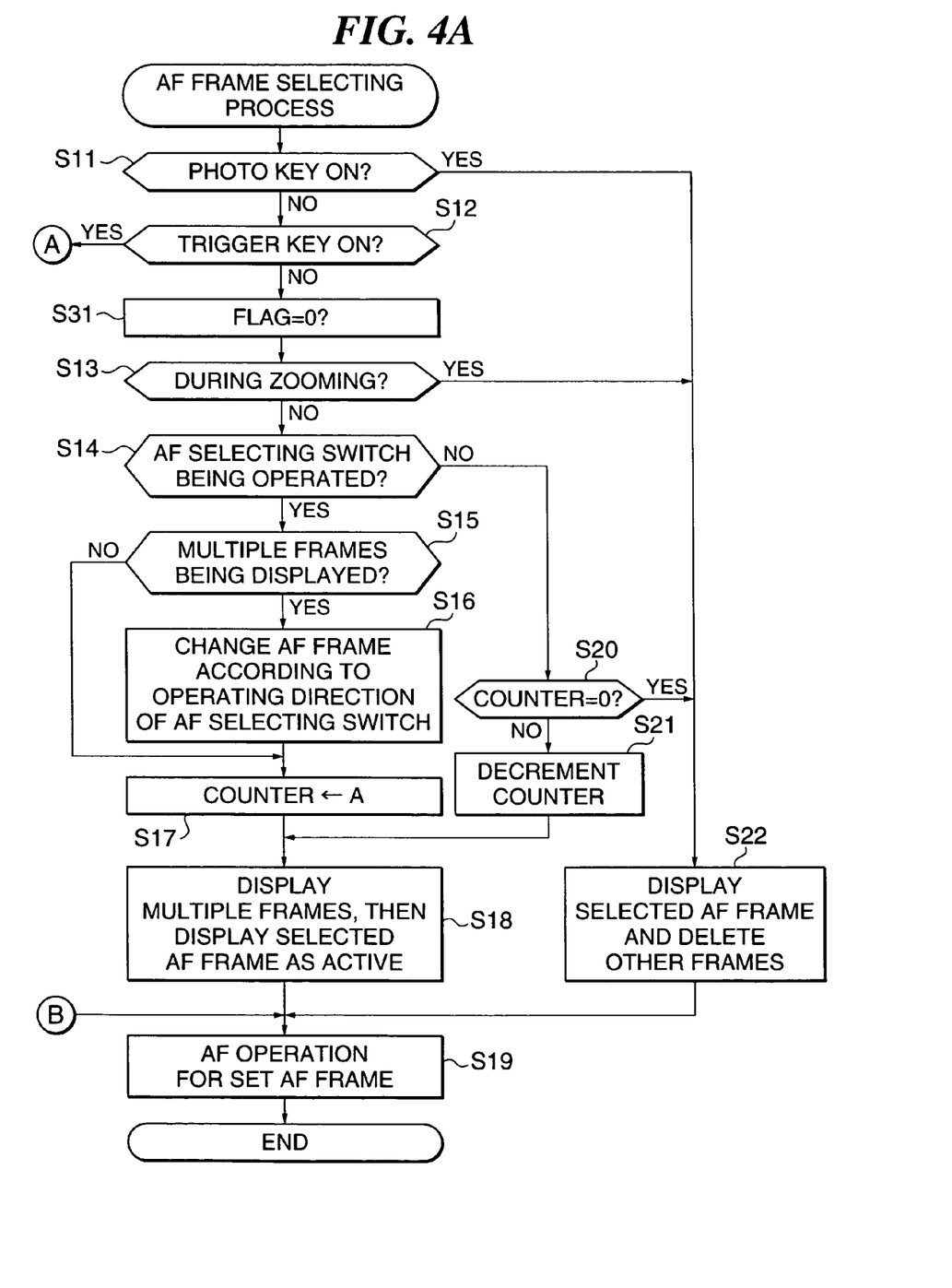
FIGS. 4A and 4B are flowchart showing the procedure of an AF frame selecting process executed by the image pickup apparatus according to a second embodiment of the present invention.
Figure 4B:
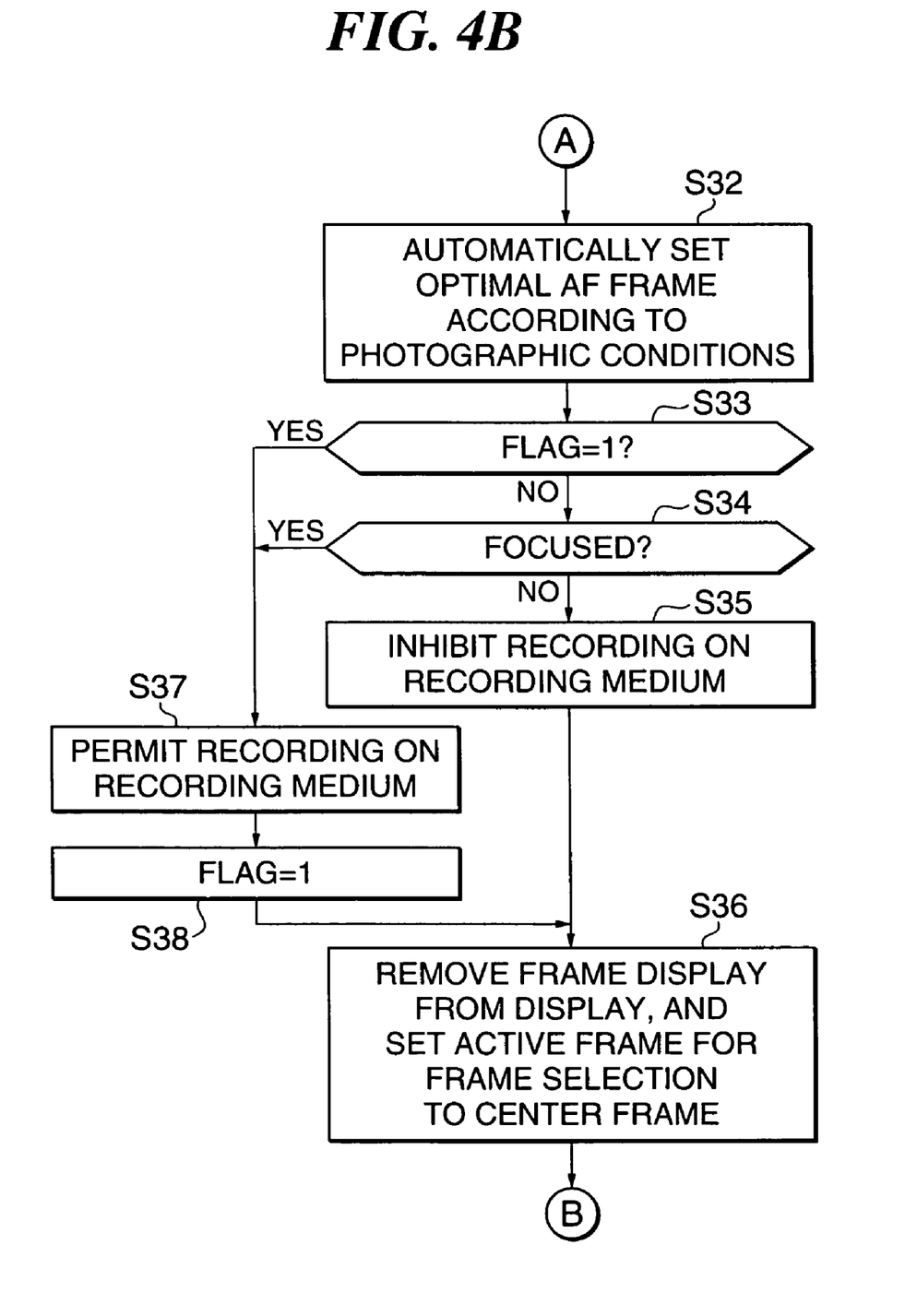

FIGS. 4A and 4B are flowchart showing a procedure of AF frame selecting processing executed by the image pickup apparatus according to the second embodiment. In FIG. 4A, steps corresponding to those in FIG. 3 are designated by identical reference numerals, and description thereof is omitted.

In FIG. 4A, in the step S12, it is determined whether the trigger switch unit 129 is ON. If it is determined that the trigger switch unit 129 is OFF, a flag is cleared in a step S31. On the other hand, when the trigger switch unit 129 is ON, the optimal AF frame for moving image photography is set in accordance with photographic conditions (step S32), and it is determined in a step S33 whether the flag is in a set state. That is, after the trigger switch unit 129 has been turned ON for the first time and the AF frame has been switched to automatic setting, it is determined whether focusing has been completed or whether focusing is still being carried out. When the AF frame has been switched for the first time, the flag is in a cleared state, and it is determined in a step S34 whether the focus lens has come into focus.

If it is determined in the step S34 that the focus lens has not come into focus, recording in the magnetic recording/reproduction apparatus 110 and recording onto the still image recording medium 114 are inhibited and the image pickup apparatus is placed in a standby state (step S35), AF frames are removed from the display such as the finder, and display thereof is inhibited. Also, AF frame display on the display such as the finder is deleted and inhibited, and if the trigger switch unit 129 has been turned OFF, the frame on the center is set to an activate state for AF frame selection so that the AF frame display is started with the frame on the center (step S36). Then, the process proceeds to a step S19, wherein an AF operation is carried out using the AF frame automatically set in the step S32.

When a perfect focus has been obtained in an AF processing routine, not shown, during the process shown in FIG. 4B, it is determined in a step S34 that the focus lens has come into focus ("YES" in the step S34), and the process proceeds to a step S37, wherein recording onto a recording medium is permitted, and the flag is set (step S38), followed by executing the processing in the step S36 to keep the active frame being set at the center frame, and the AF operation is continued (the step S19).

When the flag has been set, in the next loop of execution of the process, the process proceeds to the step S37 as a result of the determination of the step S33, and the processing in the step S37 and subsequent steps is continued until the trigger switch unit 129 is turned OFF, to carry out recording of moving images.

If it is determined in the step S12 that the trigger switch unit 129 has been turned OFF, the process proceeds to the step S31, where the flag is cleared, and then the AF frame selecting process shown in FIG. 3 is carried out in the step S13 and subsequent steps. If the photographer has not operated the focus frame selecting switch 128, the process proceeds from the step S13 to the step S20 and then the step S21, and the center frame set in advance in the step S36 is displayed on the display.

Figure 5:
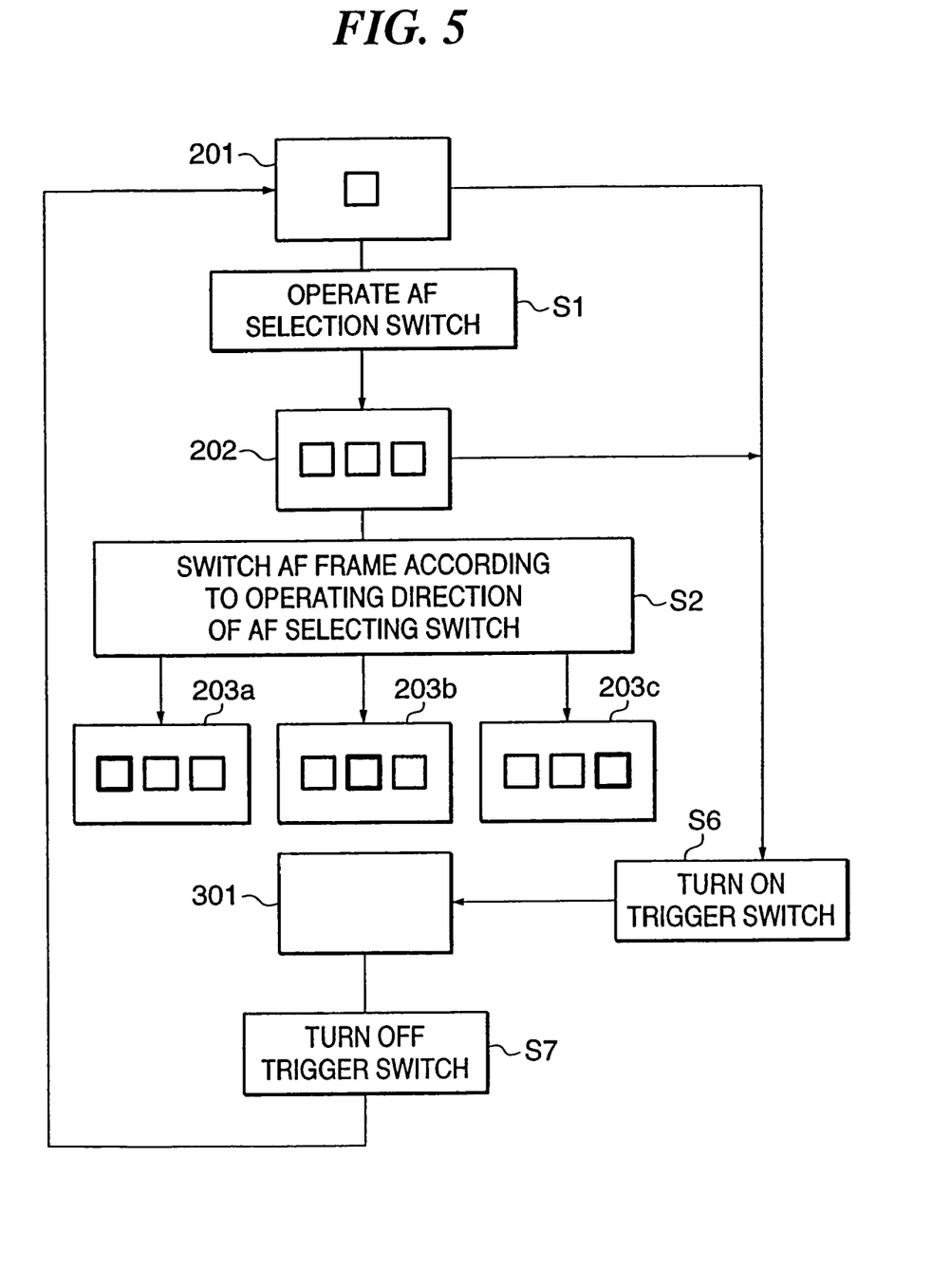
FIG. 5 is a diagram showing example displays of AF frames by the AF frame selecting process shown in FIGS. 4A and 4B.

FIG. 5 is a diagram showing example displays of the AF frames by the AF frame selecting processing shown in FIGS. 4A and 4B.

In FIG. 5, screens 201, 202, and 203*a* to 203*c* are the same as the screens 201, 202, and 203*a* to 203*c* shown in FIG. 2, and show display states in accordance with the operation of the focus frame selecting switch 128 during selection of the AF frame. For example, when a photo switch is turned ON (step S6), a distance measuring region (AF frame) displayed on the center is confirmed (301). Operations of the trigger switch unit 129 can be enabled in any state, that is, in a state shown on any of the screens 201, 202, 203a to 203c shown in FIG. 5, but when the trigger switch unit 129 is turned ON, the display state is switched to a screen 301, the AF frame is automatically set to the optimal AF frame in accordance with the photographic conditions, and the AF operation is executed using the automatically set AF frame. On the other hand, when the trigger switch unit 129 is turned OFF and the recording of moving images is terminated, the display state returns to the screen 201, and it becomes possible for the photographer to manually select the AF frame.

In this way, in the present embodiment it is possible to realize the optimal AF performance for recording moving images with focus stability being made much of. Further, when the main subject is changed by automatic switching of the distance measuring region, the recording of moving images is placed on standby until focusing is completed for the main subject, thereby making it possible to prevent unnecessary blurred images from being recorded.

As described above, according to the present invention, since the photographer selects one or more of a plurality of focus detecting regions on a screen and control is provided so that the selected focus detecting region is confirmed after the lapse of a predetermined time while the photographer is aware of the selected focus detecting region, it is possible to omit an operation required for the confirmation of the selected focus detecting region when the region is selected, and a switch for performing the operation is not required, resulting in a reduction in the costs. Besides, the omission of the operation required for the confirmation of the selected focus detecting region makes it possible for the photographer to carry out a photographic operation while looking at the monitor or through the finder, so that a manually operating function that is really useable during photography can be provided.

Also, since at the start of a zooming operation, the selected AF frame is confirmed, and AF selection operations are inhibited during a zooming operation, it is possible to determine the distance measuring region to be selected using the zoom key disposed at a position that is easiest to use in the video key layout, without the image pickup apparatus having to wait for the predetermined time period so that the distance measuring region selection can be provided as an easy-to-use function. In addition, since switching of the distance measuring region is inhibited during a zooming operation, blurring can be avoided even during high speed zooming, and a high-quality distance measurement selecting function can be provided.

Also, since the selection state of the AF frame is confirmed when the photo switch or the trigger switch is operated and AF frame selection operations are inhibited during a zooming operation, the distance measuring region to be selected can be determined using the photo switch or the trigger switch disposed at a position that is easiest to use in the video key layout, without the image pickup apparatus having to wait for the predetermined time period, so that distance measuring region selection can be provided as an easy-to-use function. Further, since change of the distance measuring region is inhibited when a focus search is being carried out during still image photography, it is possible to obtain picked-up images that have been reliably focused. In addition, since change of the distance measuring region is inhibited during recording of moving images according to an operation of the trigger switch, the occurrence of blurring until the apparatus responds to switching of the main subject is prevented, which makes it possible to provide a high-quality distance measuring region selecting function.

Moreover, when the recording of moving images is carried out using the trigger switch, the optimal AF frame for the photographic conditions is set, and the recording of moving images is inhibited until focusing is completed when the main subject is changed through switching of the AF frame. For example, even if recording of moving images is carried out according to an operation of the trigger switch with the selected distance measuring region being located at an edge of the screen, the optimal distance measuring region for moving image photography is set in accordance with the photographic conditions, and the moving image recording is placed on standby until focusing is completed for the set distance measuring region. As a result, it is possible to prevent unnecessary recording of blurred images.

Further, since the operating switch for selecting the AF frame is an operating key of a seesaw type, a dial type, or a jog type that enables switching to an AF frame (distance measurement frame) selecting mode and change of the selected distance measuring region to be carried out by the single operating member, the switching to the AF frame (distance measurement frame) selecting mode and change or switching of the selected distance measuring region can be realized by the same operating switch. Therefore, it is easy to select the distance measuring region while looking through the finder or at the monitor, so that it is possible to provide an image pickup apparatus equipped with a manually operating function that is easy to use at any time and in any photographic conditions.

It goes without saying that the object of the present invention may also be accomplished by supplying a system or an apparatus with a storage medium (or a recording medium) in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and hence the program code and a storage medium on which the program code is stored constitute the present invention.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of either of the above-mentioned embodiments on a computer, and the form of the program may be an object code, a program executed by an interpreter, or script data supplied to an OS.

Examples of the storage medium for supplying the program code include a RAM, an NV-RAM, a floppy (registered trademark) disk, an optical disk, a magnetic-optical disk, a CD-ROM, a CD-R, a CD-RW, a DVD (a DVD-ROM, a DVD-RAM, a DVD-RW, or a DVD+RW), a magnetic tape, a non-volatile memory card, and a ROM. Alternatively, the program may be supplied by downloading from another computer, a database, or the like, not shown, connected to the Internet, a commercial network, a local area network, or the like.

What is claimed is:

1. An image pickup apparatus comprising:
    an image pickup device that picks up an image of a subject and converts the image to an image pickup signal;
    a display device that displays a picked-up image based on the image pickup signal outputted from said image pickup device;
    a selecting device that selects at least one from a plurality of focus detecting regions on a screen of said display device;
    an extracting device that extracts a focus signal from the image pickup signal in the at least one focus detecting region selected by said selecting device;
    a focus adjusting device that carries out focus adjustment on said image pickup device based on the focus signal extracted by said extracting device;
    an operating element that enables a photographer to instruct to change the at least one focus detecting region selected by said selecting device; and
    a confirming device that confirms the at least one focus detecting region instructed to change by the photographer using said operating element when a predetermined condition is satisfied,
    wherein said image pickup device is capable of picking up the image of the subject with zooming, and the predetermined condition is that a zooming operation has been started by said pickup device.

2. An image pickup apparatus according to claim 1, further comprising an inhibiting device that inhibits an operation of selecting the at least one focus detecting region by said selecting device during the zooming operation by said image pickup device.

3. An image pickup apparatus according to claim 1, wherein said display device displays the at least one focus detecting region selected by said selecting device in a manner superimposed on the picked-up image.

4. An image pickup apparatus according to claim 1, wherein said operating element is an operating element selected from the group consisting of a seesaw-type operating element, a dial-type operating element, and a jog-type operating element.

5. An image pickup apparatus comprising:
    an image pickup device that picks up an image of a subject and converts the image to an image pickup signal;
    a display device that displays a picked-up image based on the image pickup signal outputted from said image pickup device;
    a selecting device that selects at least one from a plurality of focus detecting regions on a screen of said display device;
    an extracting device that extracts a focus signal from the image pickup signal in the at least one focus detecting region selected by said selecting device;
    a focus adjusting device that carries out focus adjustment on said image pickup device based on the focus signal extracted by said extracting device;
    an operating element that enables a photographer to instruct to change the at least one focus detecting region selected by said selecting device;
    a confirming device that confirms the at least one focus detecting region instructed to change by the photographer using said operating element when a predetermined condition is satisfied; and
    a recording device that records the image pickup signal outputted from said image pickup device,
    wherein the predetermined condition is that an operation of recording the image pickup signal has been started by said recording device.

6. An image pickup apparatus according to claim 5, further comprising an inhibiting device that inhibits an operation of selecting the at least one focus detecting region by said selecting device during the recording operation by said recording device.

7. A control method for an image pickup apparatus comprising:
    a display step of displaying, on a display device, an image pickup signal outputted from an image pickup device that picks up an image of a subject and converts the image to the image pickup signal;
    a selecting step of selecting at least one from a plurality of focus detecting regions on a screen of the display device;
    an extracting step of extracting a focus signal from the image pickup signal in the at least one focus detecting region selected in said selecting step;
    a focus adjusting step of carrying out focus adjustment on the image pickup device based on the focus signal extracted in said extracting step; and
    a confirming step of confirming the at least one focus detecting region instructed to change by the photographer using an operating element that enables a photographer to instruct to change the at least one focus detecting region selected in said selecting step when a predetermined condition is satisfied,
    wherein the image pickup device is capable of picking up the image of the subject with zooming, and the predetermined condition is that a zooming operation has been started by the pickup device.

8. A control method for an image pickup apparatus comprising:
    a display step of displaying, on a display device, an image pickup signal outputted from an image pickup device that picks up an image of a subject and converts the image to the image pickup signal;
    a selecting step of selecting at least one from a plurality of focus detecting regions on a screen of the display device;
    an extracting step of extracting a focus signal from the image pickup signal in the at least one focus detecting region selected in said selecting step;
    a focus adjusting step of carrying out focus adjustment on the image pickup device based on the focus signal extracted in said extracting step; and
    a confirming step of confirming the at least one focus detecting region instructed to change by the photographer using an operating element that enables a photographer to instruct to change the at least one focus detecting region selected in said selecting step when a predetermined condition is satisfied; and
    a recording step of recording the image pickup signal outputted from said image pickup device,
    wherein the predetermined condition is that an operation of recording the image pickup signal has been started in said recording step.

9. A computer-readable medium storing a computer program for an image pickup apparatus, the computer program comprising:
    a display module for displaying, on a display device, an image pickup signal outputted from an image pickup device that picks up an image of a subject and converts the image to the image pickup signal;
    a selecting module for selecting at least one from a plurality of focus detecting regions on a screen of the display device;

an extracting module for extracting a focus signal from the image pickup signal in the at least one focus detecting region selected by said selecting module;

a focus adjusting module for carrying out focus adjustment on the image pickup device based on the focus signal extracted by said extracting module; and a confirming module for confirming the at least one focus detecting region instructed to change by the photographer using an operating element that enables a photographer to instruct to change the at least one focus detecting region selected by said selecting module when a predetermined condition is satisfied, wherein said image pickup device is capable of picking up the image of the subject with zooming, and the predetermined condition is that a zooming operation has been started by said pickup device.

10. A computer-readable medium storing a computer program for an image pickup apparatus, the computer program comprising:

a display module for displaying, on a display device, an image pickup signal outputted from an image pickup device that picks up an image of a subject and converts the image to the image pickup signal;

a selecting module for selecting at least one from a plurality of focus detecting regions on a screen of the display device;

an extracting module for extracting a focus signal from the image pickup signal in the at least one focus detecting region selected by said selecting module;

a focus adjusting module for carrying out focus adjustment on the image pickup device based on the focus signal extracted by said extracting module; and a confirming module for confirming the at least one focus detecting region instructed to change by the photographer using an operating element that enables a photographer to instruct to change the at least one focus detecting region selected by said selecting module when a predetermined condition is satisfied; and a recording module for recording the image pickup signal outputted from said image pickup device, wherein the predetermined condition is that an operation of recording the image pickup signal has been started by said recording module.

* * * * *